United States Patent
Fan et al.

(10) Patent No.: US 11,517,858 B2
(45) Date of Patent: Dec. 6, 2022

(54) POLYMER MEMBRANE WITH VERTICALLY ALIGNED PORE CHANNELS AND CONTROLLED PORE SURFACE CHEMISTRY

(71) Applicants: National Technology & Engineering Solutions of Sandia, LLC, Albuquerque, NM (US); STC.UNM, Albuquerque, NM (US)

(72) Inventors: Hongyou Fan, Albuquerque, NM (US); Susan Rempe, Albuquerque, NM (US); Ying-Bing Jiang, Albuquerque, NM (US)

(73) Assignee: National Technology & Engineering Solutions of Sandia, LLC, Albuquerque, NM (US)

(*) Notice: Subject to any disclaimer, the term of this patent is extended or adjusted under 35 U.S.C. 154(b) by 235 days.

(21) Appl. No.: 16/903,608

(22) Filed: Jun. 17, 2020

(65) Prior Publication Data
US 2021/0016230 A1 Jan. 21, 2021

Related U.S. Application Data

(60) Provisional application No. 62/875,812, filed on Jul. 18, 2019.

(51) Int. Cl.
*B01D 69/02* (2006.01)
*B01D 71/80* (2006.01)
*B01D 69/10* (2006.01)
*B01D 67/00* (2006.01)

(52) U.S. Cl.
CPC .......... *B01D 69/02* (2013.01); *B01D 67/0011* (2013.01); *B01D 67/0023* (2013.01); *B01D 67/0093* (2013.01); *B01D 69/10* (2013.01); *B01D 71/80* (2013.01); *B01D 2323/28* (2013.01); *B01D 2325/021* (2013.01)

(58) Field of Classification Search
CPC ...................................................... B01D 71/80
See application file for complete search history.

(56) References Cited

U.S. PATENT DOCUMENTS 7,683,025 B2 * 3/2010 Stupp ....................... C07K 7/02
514/3.3

FOREIGN PATENT DOCUMENTS

EP 3000523 A1 * 3/2016 ......... B01D 67/0013

OTHER PUBLICATIONS

Tokarev et al. "Microphase Separation in Thin Films of Poly(styrene-block-4-vinylpyridine) Copolymer-2-(4¢-Hydroxybenzeneazo)benzoic Acid Assembly" (Macromolecules 2005, 38, p. 507-516) (Year: 2005).*

Camerona M.A. et al., "Atomic Layer Deposition of SiO2 and TiO2 in Alumina Tubular Membranes: Pore Reduction and Effect of Surface Species on Gas Transport", Langmuir (2000), vol. 16, pp. 7435-7444.

(Continued)

*Primary Examiner* — Ryan B Huang
(74) *Attorney, Agent, or Firm* — Kevin W. Bieg

(57) ABSTRACT

A nanoporous polymer membrane with vertically aligned pore channels can be synthesized through self-assembly of amphiphilic block copolymers on a supporting substrate. The pore surface chemistry can be functionalized for selective anion transport.

16 Claims, 6 Drawing Sheets

(56) References Cited

OTHER PUBLICATIONS

Jiang, Y-B. et al., "Sub-10 nm Thick Microporous Membranes Made by Plasma-Defined Atomic Layer Deposition of a Bridged Silsesquioxane Precursor", J. Am Chem Soc. (2007), vol. 129, pp. 15446-15447.

Parsons, G.N. et al., "Progress and future directions for atomic layer deposition and ALD-based chemistry", MRS Bulletin (2011), vol. 36, pp. 865-871.

* cited by examiner

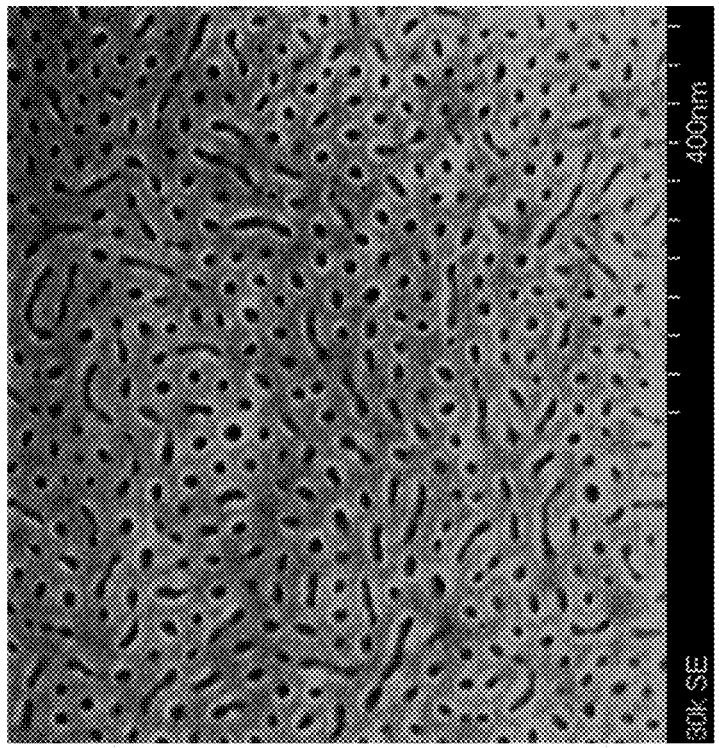
FIG. 2B Thick film, 3 wt%
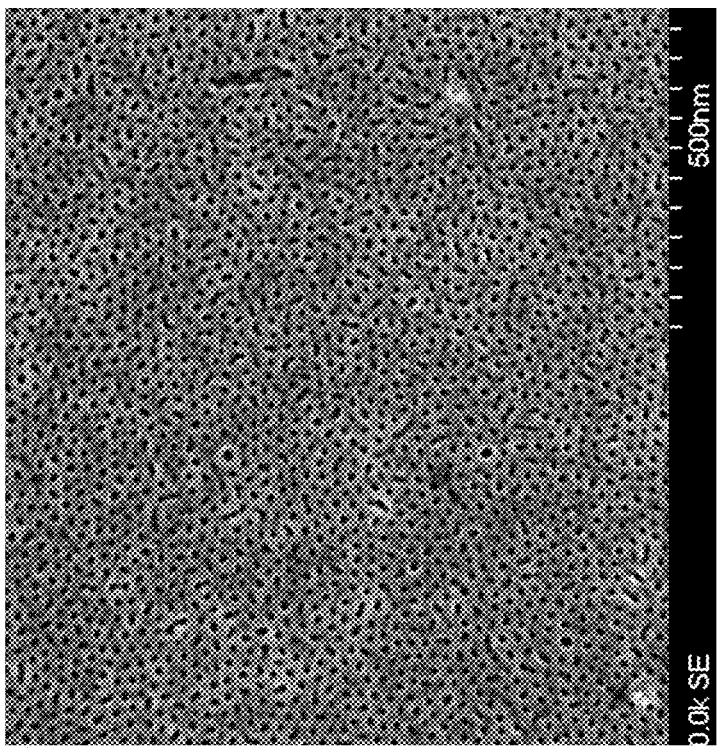
FIG. 2A Thin film, 0.3 wt%

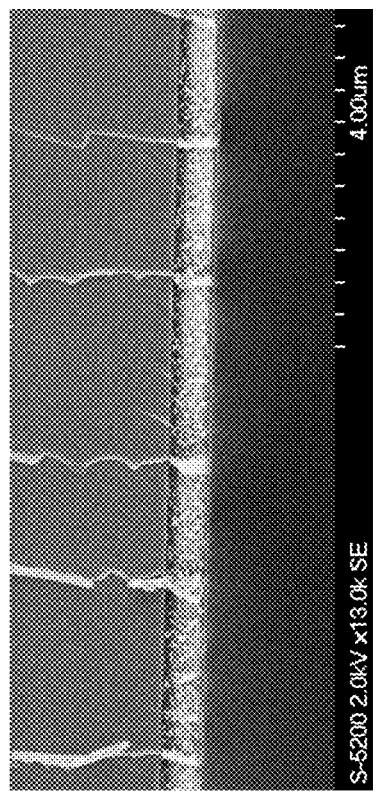
Thin film (28 nm). 0.3 wt%
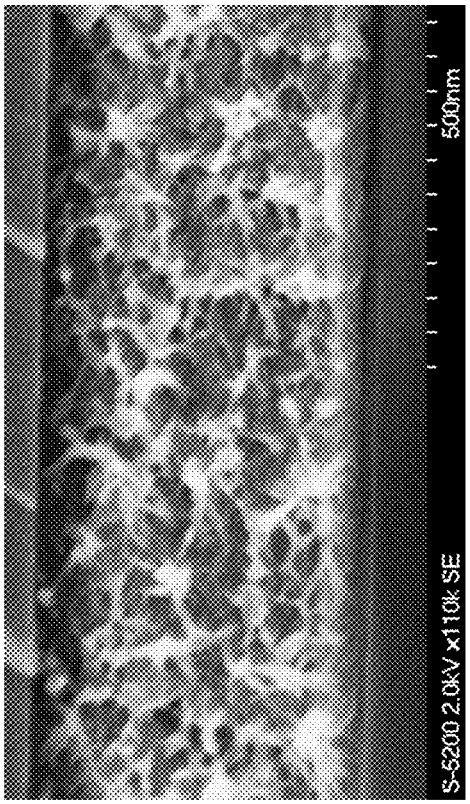
Thick film (517 nm). 3 wt%
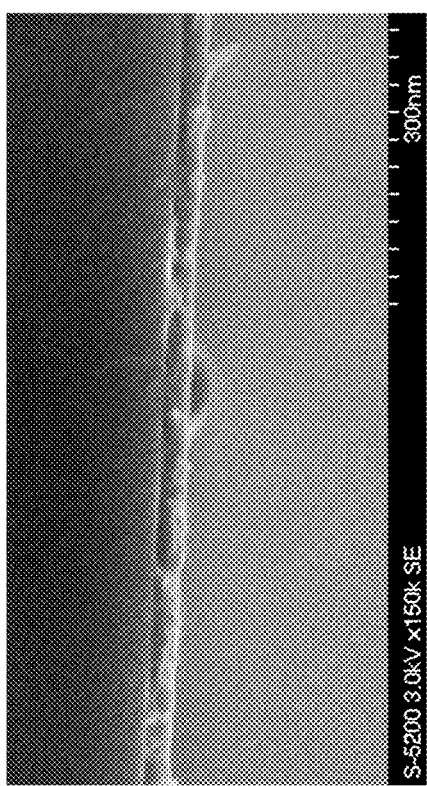
FIG. 3A
FIG. 3B

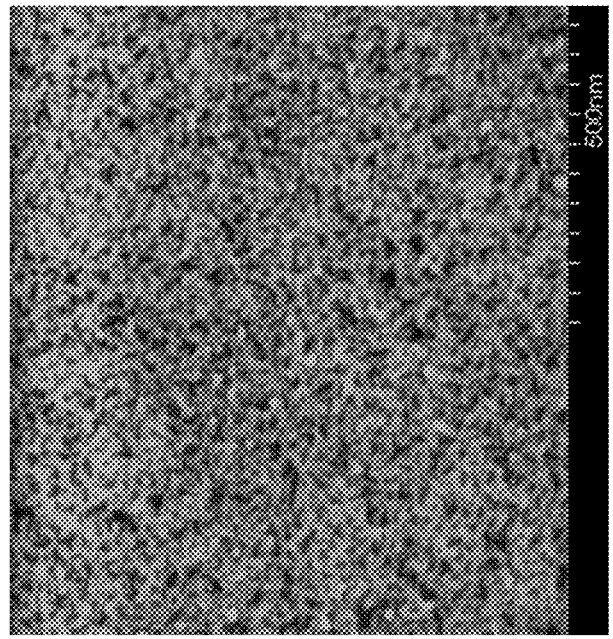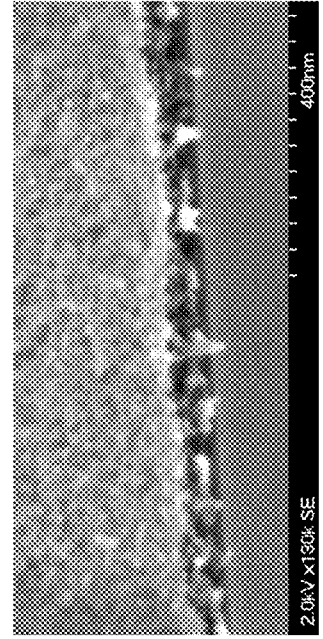
FIG. 6A
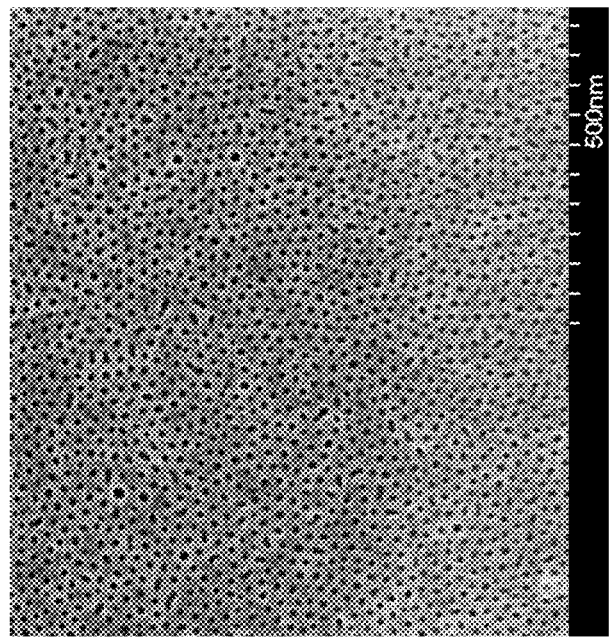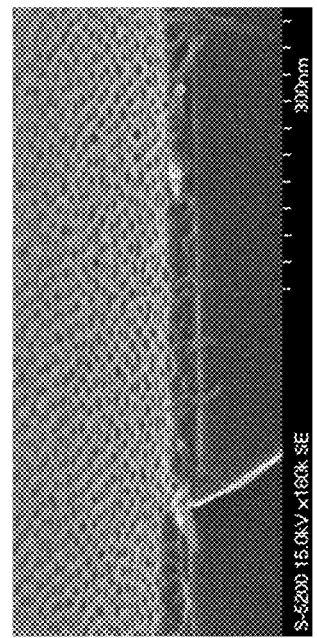
FIG. 6B

POLYMER MEMBRANE WITH VERTICALLY ALIGNED PORE CHANNELS AND CONTROLLED PORE SURFACE CHEMISTRY

CROSS-REFERENCE TO RELATED APPLICATION

This application claims the benefit of U.S. Provisional Application No. 62/875,812, filed Jul. 18, 2019, which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to synthetic membranes and, in particular, to a polymer membrane with vertically aligned pore channels and controlled pore surface chemistry.

BACKGROUND OF THE INVENTION

Synthetic membranes are widely used in the water, food, biopharma, petrochemical, microelectronics, and medical industries to perform "filtration" with varying degrees of "fineness" and complexity. Globally, rapid population growth and industrialization as well as increasing energy production pose significant challenges regarding the availability of potable water. Membrane-based separation processes are at the forefront of technological solutions to address the problems for water purification. The performance of a synthetic membrane is largely determined by its composition, internal micro- and nano-scale structure, porosity, surface functionalization, and thickness. Although sophisticated approaches and processing have been developed using novel membrane chemistry to improve membrane performance, they have not translated into technological successes due to challenges in reliability and excessive cost, the latter due to lack of scalable manufacturing.

Therefore, a need remains for synthetic membranes with improved function and reduced cost, which is essential for world-wide adoption of membrane-based water treatment technologies. More particularly, to reduce the cost of water purification, synthetic membranes with vertical pore channels to substrates and densely packed pores are critical for fast transport and selective ion transport.

SUMMARY OF THE INVENTION

The present invention is directed to the synthesis of nanoporous polymer membranes with hollow pore channels vertically aligned to the surface of a supporting substrate. The porous membranes can be synthesized through self-assembly of amphiphilic block copolymers on the substrate. The pore channels can be self-assembled into hexagonal arrays leading to very densely packing on the substrate. The pore size can be controlled to be of order 10 nm. Further, the pore surface chemistry can be functionalized for selective anion transport, for example to be positively charged pyridine groups. Initial charge flux characterizations on such positively-charged polymer membranes has demonstrated excellent selectivity on anions compared with commercial polymer membranes. Additionally, atomic/molecular layer deposition (ALD/MLD) can be used to further tune the pore size and to functionalize pore surface chemistry for selectivity. The overall thickness of a thin film porous membrane can be less than 100 nm, which can provide fast transport. An advantage of this method is that the synthetic process can be conducted in solutions, thus the membrane can be applied as a thin or thick film to large area substrates through spin coating, ink-jet printing, or roll-to-roll printing and the thickness of the membrane can be readily controlled through printing speed and solution concentration.

BRIEF DESCRIPTION OF THE DRAWINGS

The detailed description will refer to the following drawings, wherein like elements are referred to by like numbers.

FIG. 2A is a scanning electron microscope (SEM) image of the top surface of a thin film membrane made with a 0.3 wt % PS-PVP:HAPA solution. FIG. 2B is a SEM image of the top surface of a thick film membrane made with a 3 wt % solution.

FIG. 3A shows cross-sectional SEM images of the thin film membrane. FIG. 3B shows cross-sectional SEM images of the thick film membrane.

FIG. 6A shows top-view and cross-sectional SEM images of a thin film membrane. FIG. 6B shows top-view and cross-sectional SEM images of the thin film membrane after atomic layer deposition (ALD) of $Al_2O_3$.

DETAILED DESCRIPTION OF THE INVENTION

Figure 1:
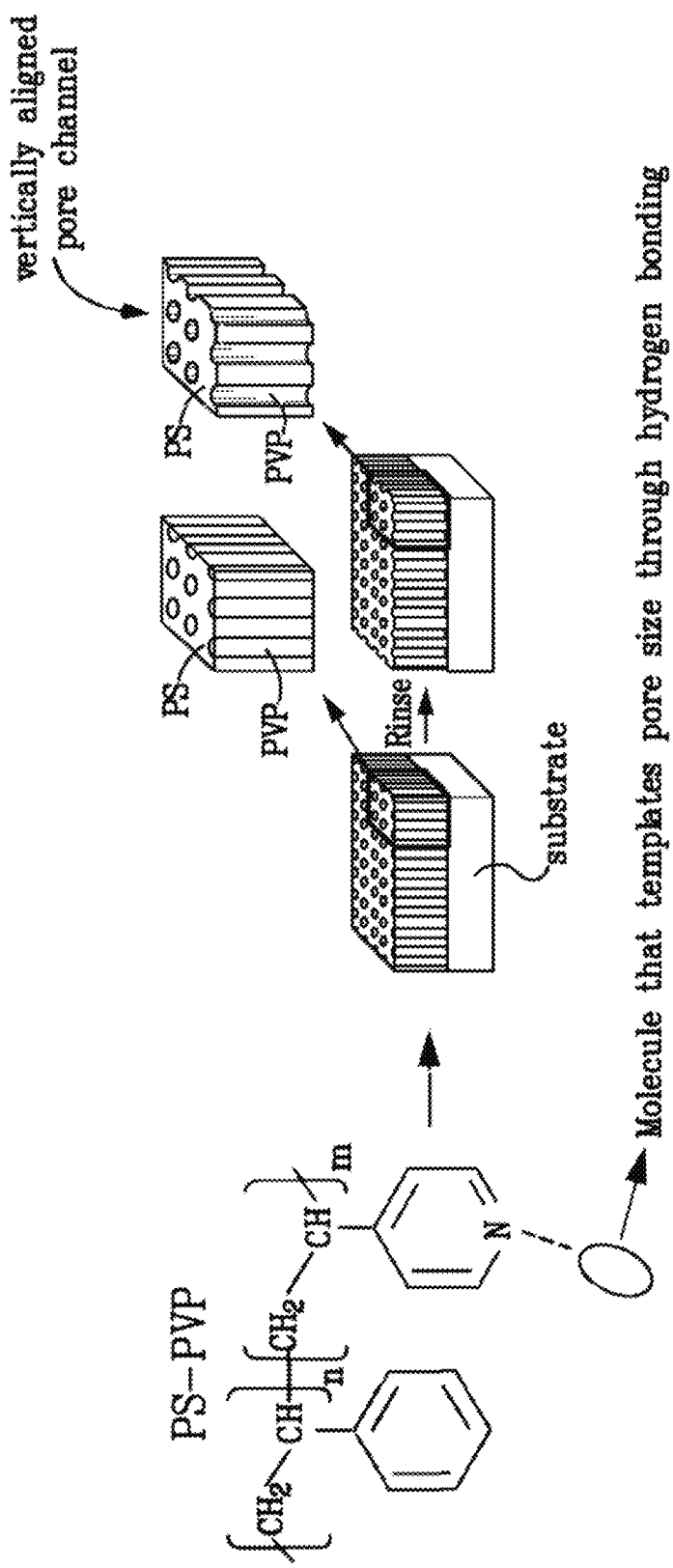
FIG. 1 is a schematic illustration of an exemplary method to synthesize a nanoporous membrane with hollow pore channels vertically aligned to a supporting substrate.
Figure 4B:
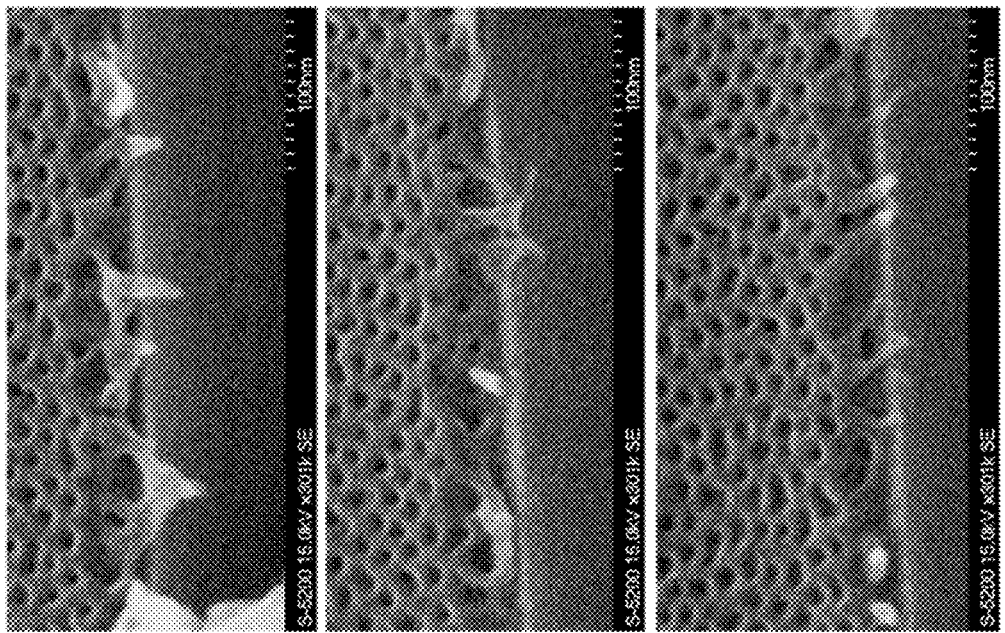
FIG. 4B shows cross-sectional SEM images of the thin film membrane tilted at 35°.
Figure 4A:
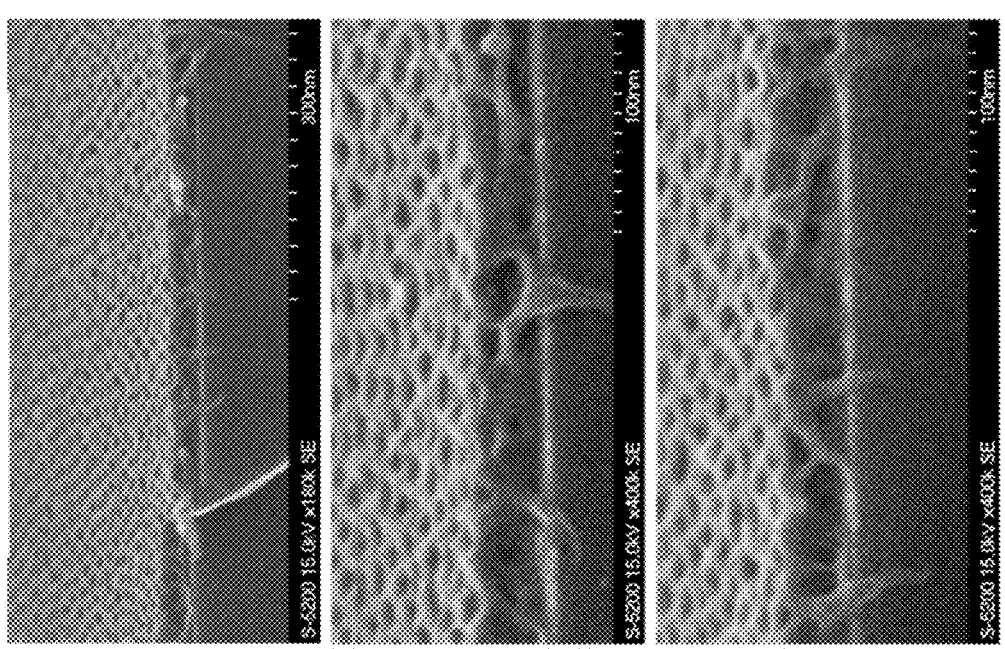
FIG. 4A shows cross-sectional SEM images of the thin film membrane tilted at 15°.

The invention is directed to the synthesis of vertically aligned pore channels in polymer thin films on arbitrary substrates through self-assembly of an amphiphilic block copolymer. In the example illustrated in FIG. 1, an amphiphilic block copolymer, such as polystyrene-b-polyvinylpyridine (e.g., PS-PVP: PS-P4VP or PS-P2VP, PS-PVP-PS, PVP-PS-PVP, etc) is first dissolved in a good solvent for both of the hydrophobic and hydrophilic polymer blocks (e.g., PS and PVP). Other amphiphilic block copolymers can also be used, including poly((meth)acrylic acid)-based block copolymers, such as poly(styrene-b-acrylic acid); poly(ethylene oxide)-based block copolymers, such as poly(styrene-b-ethylene oxide) and poly(2-vinyl pyridine-b-ethylene oxide); polysiloxane-based block copolymers, such as poly(dimethylsiloxane-b-methacrylic acid); poly(styrene)-based block copolymers, such as poly(styrene-b-acrylic acid), poly(styrene-b-ethylene oxide), poly(styrene-b-acrylamide), poly(styrene-b-methacrylic acid), poly(styrene-b-propylacrylic acid), poly(styrene-b-sodium acrylate), poly(styrene-b-sodium methacrylate), poly(styrene-b-N-methyl 2-vinyl pyridinium iodide), poly(styrene-b-N-methyl-4-vinyl pyridinium iodide), and poly(styrene sulfonic acid-b-methylbutylene); and poly vinyl naphthalene-based block copolymers, such as poly(2-vinyl naphthalene-b-methyl methacrylate). For example, the solvent can be a polar organic solvent, such as dimethylformamide (DMF), tetrahydrofuran (THF), or dioxane. A hydrogen-bonding acid, such as a carboxylic acid (e.g., formic acid, acetic acid, benzoic acid, acrylic acid, glucuronic acid, lactic acid, citric acid, amino acid, or protein), that comprises a hydrogen bonding molecule that can form an intermolecular hydrogen bond with the electronegative nitrogen group of pyridine is then added into the solution under mild stirring. As the carboxylic acid is added to the PS-PVP solution, the hydrophilic PVP blocks are protonated and become less soluble in the solvent. The resulting copolymer:acid solution can be deposited on a substrate. The PVP blocks self-assemble to form vertically aligned hexagonal arrays of PVP columns surrounded by the PS matrix upon evaporation of the solvent by either heat or vacuum. The hydrogen bonding molecules in the column interiors can then be removed by an alcohol (e.g., methanol or ethanol) rinse. During alcohol wash, the preferential solvation of the PVP blocks with alcohol breaks the hydrogen bonds between the PVP blocks and the hydrogen bonding molecules, and the alcohol dissolves and selectively removes the hydrogen bonding molecules to form hollow, vertically aligned pore channels in the polymer membrane. Essentially, the size of hydrogen bonding molecules templates the pore size, which can be tuned between 1-20 nm in diameter depending on the size of the templating molecules. Because the films can be deposited through spin-coating, for example, the coatings can be applied to large area substrates and the thickness of the coating can be readily controlled through spin speed or concentration. Also, because of the hexagonal ordered nature, the pore density can be very high.

As an example, PS-PVP (35.5 k-4.4 k block chain lengths, 74 mg) and 2-(4'-hydroxybenzeneazo) benzoic acid (HABA, 74 mg) were dissolved separately in 1.5 mL dioxane at 70° C. with stirring. The HABA solution was then heated to 95° C. and added in the PS-PVP solution while stirring. The mixture was cooled down to room temperature and left stirred overnight. In the final copolymer:acid solution, the weight ratio PS-PVP:HABA was 4:1, and the total wt % in final solution was 3%. To deposit a thin film, a Si wafer strip was cleaned by sonication in acetone and isopropyl alcohol and then treated by UV-ozone cleaning. A thin film of the final solution was deposited on the Si wafer strip by dip coating and allowed to dry in air. The film was then soaked in methanol for 2 min to remove HABA. As shown in FIGS. 2A, 2B. 3A, 3B, 4A, and 4B, SEM images revealed porous structures in thin and thick film polymer membranes.

Figure 5:
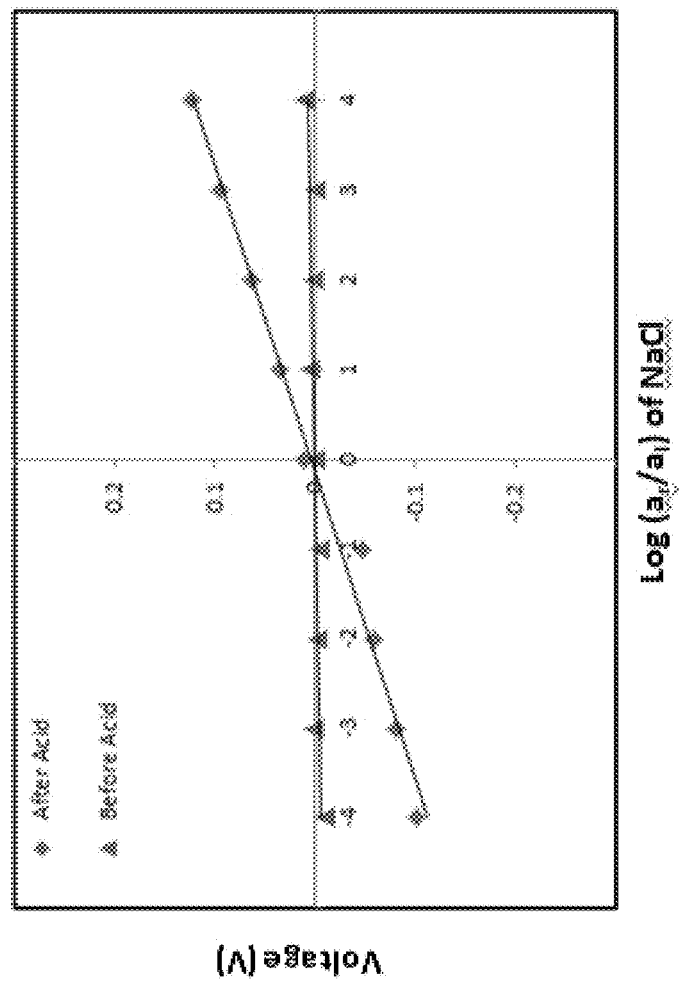
FIG. 5 is a plot of the voltage generated by a NaCl concentration difference across the membrane before and after protonation of the pore surface.

Removal of the hydrogen bonding molecules by washing results in exposure of the pyridine groups on the pore channel surface. The pore surface chemistry can be functionalized, for example to be positively charged pyridine groups for selective anion transport. For example, the nitrogen groups can be functionalized through protonation to a tetraammonium N+ positive charged surface. The pore accessibility of a positive-charged polymer membrane was tested through electrochemical transport and showed excellent anionic (Cl−) charge selectivity and transport. As shown in FIG. 5, with 1 M NaCl on one side and 0.1 mM on the other side, the voltage across the functionalized membrane was measured to be about 0.16V, suggesting that the Cl− diffuses much faster than Na+ across the membrane, demonstrating excellent anion selectivity.

Additionally, atomic/molecular layer deposition (ALD/MLD) can be used to further tune the pore size and to functionalize the pore surface for selectivity. See G. N. Parsons et al., *MRS Bull.* 36(11), 865 (2011); and M. A. Cameron et al., *Langmuir* 16, 7435 (2000); and Y. B. Jiang et al., *J. Am. Chem. Soc.* 129, 15446 (2007), which are incorporated herein by reference. FIGS. 6A and 6B show top surfaces and cross-sectional SEM images of a thin film membrane before and after ALD of $Al_2O_3$.

The present invention has been described as a polymer membrane with vertically aligned pore channels and controlled pore surface chemistry. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A method to synthesize a polymer membrane with vertically aligned pore channels, consisting of:
    dissolving an amphiphilic block copolymer in a solvent for both hydrophobic and hydrophilic polymer blocks to form a copolymer solution;
    adding a hydrogen-bonding acid to the copolymer solution, wherein hydrogen bonding molecules of the hydrogen-bonding acid form hydrogen bonds with the hydrophilic polymer blocks in a copolymer:acid solution,
    depositing the copolymer:acid solution on a substrate;
    removing the solvent, whereby the hydrophilic polymer blocks and hydrogen bonding molecules self-assemble to form vertically aligned columns surrounded by a matrix of the hydrophobic polymer blocks; and
    removing the hydrogen bonding molecules with an alcohol rinse to form a plurality of vertically aligned pore channels in a polymer membrane.

2. The method of claim 1, wherein the amphiphilic block copolymer comprises polystyrene-b-polyvinylpyridine.

3. The method of claim 1, wherein the amphiphilic block copolymer comprises a poly(vinylpyridine)-based block copolymer, poly((meth)acrylic acid)-based block copolymer, poly(ethylene oxide)-based block copolymer, polysiloxane-based block copolymer, poly(styrene)-based block copolymer, or poly vinyl naphthalene-based block copolymer.

4. The method of claim 1, wherein the solvent comprises a polar organic solvent.

5. The method of claim 4, wherein the polar organic solvent comprises dimethylformamide, tetrahydrofuran, or dioxane.

6. The method of claim 1, wherein the hydrogen-bonding acid comprises a carboxylic acid.

7. The method of claim 6, wherein the carboxylic acid comprises benzoic acid.

8. The method of claim 7, wherein the benzoic acid comprises 2-(4'-hydroxybenzeneazo) benzoic acid.

9. The method of claim 6, wherein the carboxylic acid comprises formic acid, acetic acid, acrylic acid, glucuronic acid, lactic acid, citric acid, amino acid, or a protein.

10. The method of claim 1, wherein the plurality of vertically aligned pore channels comprises a hexagonal array.

11. The method of claim 1, wherein the thickness of the polymer membrane is less than 100 nm.

12. The method of claim 1, wherein a pore size of the vertically aligned pore channels is determined by the size of the hydrophilic polymer block and the size of the hydrogen bonding molecule.

13. The method of claim 12, wherein the pore size of the vertically aligned pore channels is less than 20 nm.

14. The method of claim 1, further comprising functionalizing the vertically aligned pore channels.

15. The method of claim 1, further comprising atomic or molecular layer deposition of a coating in the vertically aligned pore channels.

16. The method of claim 15, wherein the coating comprises $Al_2O_3$, $TiO_2$, or $SiO_2$.

* * * * *